United States Patent [19]
Nonami

[11] Patent Number: 5,528,247
[45] Date of Patent: Jun. 18, 1996

[54] MOBILE SATELLITE COMMUNICATION SYSTEM

[75] Inventor: Takayuki Nonami, Kamakura, Japan

[73] Assignee: Mitsubishi Denki Kabushiki Kaisha, Tokyo, Japan

[21] Appl. No.: 255,963

[22] Filed: Jun. 7, 1994

[30] Foreign Application Priority Data

Jul. 7, 1993 [JP] Japan .................................. 5-167650

[51] Int. Cl.$^6$ .................................................. G01S 5/02
[52] U.S. Cl. .................... 342/357; 455/12.1; 455/33.1; 455/54.1
[58] Field of Search ................... 342/357; 455/12.1, 455/33.1, 54.1

[56] References Cited

U.S. PATENT DOCUMENTS

| | | | |
|---|---|---|---|
| 4,797,677 | 1/1989 | MacDoran et al. | 342/352 |
| 4,943,808 | 7/1990 | Dulck et al. | 342/356 |
| 5,339,353 | 8/1994 | Asahara et al. | 379/59 |
| 5,343,512 | 8/1994 | Wang et al. | 379/59 |

FOREIGN PATENT DOCUMENTS

| | | |
|---|---|---|
| 0546758 | 6/1993 | European Pat. Off. . |
| 0562374 | 9/1993 | European Pat. Off. . |
| 1190134 | 7/1989 | Japan . |
| 42913 | 1/1992 | Japan . |
| 2271486 | 4/1994 | United Kingdom . |
| 2275588 | 8/1994 | United Kingdom . |
| 9219050 | 10/1992 | WIPO . |

*Primary Examiner*—Thomas H. Tarcza
*Assistant Examiner*—Dao L. Phan
*Attorney, Agent, or Firm*—Rothwell, Figg, Ernst & Kurz

[57] ABSTRACT

The present invention relates to a mobile satellite communication system. It is the object of the invention to provide a mobile satellite communication system capable of monitoring a location of a mobile station by data on its absolute location on the ground L, in lieu of relative monitoring thereof with respect to satellite base stations, to thereby ensure an effective location registration and suppress an increase of traffic in communication lines arising from location registrations. The satellite base stations are each equipped with a navigation signal generator for issuing navigation signals. The mobile station detects its absolute location on the ground L based on the navigation signals received from the satellite base stations, and executes its location registration procedure by use of identification data (communication zone ID) associated with the communication zone in which it lies and which is determined by the thus detected absolute location data.

19 Claims, 10 Drawing Sheets

MOBILE SATELLITE COMMUNICATION SYSTEM

BACKGROUND OF THE INVENTION

1. Field of the Invention

The present invention relates to a mobile satellite communication system and, more particularly, to a process of location registration for allowing a monitor section of the system to access location data of a mobile station which may be used for monitoring the mobile station.

2. Description of the Related Arts

Referring first to FIG. 1, there is shown a configuration of a conventional mobile satellite communication system using low orbit satellites. In the diagram, reference numeral 50 generally designates a conventional mobile satellite communication system using the low orbit satellites. The system 50 comprises a mobile station 1 able to move on the ground L and executing a location registration for informing a system monitor section of its location so as to be monitored based on the location registration data. The system 50 further comprises a plurality of satellite base stations 2a to 2c each moving along its orbit round the Earth and capable of communicating with the mobile station now being located within its service area (hereinafter, referred to also as control cell), and a plurality of earth switching centres 3 placed on the ground and constituting a communication network in cooperation with the satellite base stations 2a to 2c.

In the conventional mobile satellite communication system 50, the location registration is effected by means of base station ID's which are assigned to the satellite base stations 2a to 2c, that is, identification date on the satellite base station. More specifically, using the base station ID's, the mobile station 1 informs a system monitor section (not shown) of which one of a plurality of control cells 4 associated with the satellite base stations the mobile station 1 lies in.

Referring next to FIG. 2, there is shown a functional block diagram of a mobile station, a satellite base station, and an earth switching centre, which constitute the mobile satellite communication system. As a fundamental arrangement of a radio equipment, the mobile station 1 includes a transmitter/receiver section 12 having an antenna 11 connected thereto, and a communication control means 13 for controlling signals to be transmitted or received. Further, as the measures of effecting the location registration, the mobile station 1 includes a base station ID memory means 15, a comparison/update means 14, and a location registration means 16. The memory means 15 stores, as its location data, a base station ID of the satellite base station. The comparison/update means 14 compares the base station ID being stored with the base station ID derived from the satellite base station being in communication therewith, and if they are different from each other, updates the base station ID within the memory means 15 into a base station ID of the satellite base station. The location registration means 16 receives a comparison noncoincidence output from the comparison/update means 16, and transmits the mobile station ID to the transmitter/emitter section 12 by way of the communication control means 13.

The satellite base station 2a includes a transmitter/receiver section 22 having an antenna 21 connected thereto, a communication control means 23 for controlling the signals to be transmitted or received, and a base station ID output section 24 for outputting the base station ID signals serving as its identification data to the transmitter/receiver section 22. The earth switching centres 3 each include a transmitter/receiver section 32 having an antenna 31 connected thereto, a communication control means 33 for controlling the signals to be transmitted or received, and an arrangement not shown for transmitting or receiving signals with respect to the terrestrial telephone lines.

The action of the conventional system will be described hereinbelow. In this mobile satellite communication system 50, the mobile station 1, when energized, communicates with the satellite base station 2a managing the control cell 4 in which it lies. The mobile station 1 then compares the base station ID of the satellite base station 2a with the base station ID being stored within its base station ID memory means 15. If noncoincident, the location registration means 16 outputs the mobile station ID signal to the transmitter/receiver section 12 by way of the communication control means 13. The transmitter/receiver section 12, upon receiving this output, transmits the mobile station ID to the satellite base station 2a. When the satellite base station 2a is allowed to receive the location data of the mobile station 1, the new location data associated with the satellite base station 2a is registered within the monitor section of the system over the communication network of the system. Thus, the location registration procedure is carried out.

Thereafter, in the receiving mode, the movement of the mobile station 1 on the earth and the movement of the satellite base station 2a along the orbit round the Earth may cause a change of the satellite base stations to serve the mobile station 1. When the base station ID received by the mobile station 1 differs from the base station ID being stored within the memory means 15 of the mobile station 1, the same location registration procedure as the above is to be carried out.

In this manner, after energization of the mobile station 1, its location is constantly monitored by the monitor section of the system. For instance, when the mobile station 1 receives a call from a terrestrial telephone line (not shown), the monitor section of the system calls the mobile station 1 through the satellite base station 2a corresponding to the control cell in which the mobile station 1 lies at that time, over the communication network linking the earth switching centres 3 placed at various points on the ground with the satellite base stations 2a to 2c, to connect the terrestrial telephone line with the mobile station 1.

In this manner, the mobile satellite communication system 50 ensures that the mobile station 1 is connected to the terrestrial telephone lines irrespective of the terrestrial location of the mobile station 1.

It will be understood that although FIG. 1 depicts only three satellite base stations and a single earth switching centre for convenience of illustration, in the actual mobile satellite communication system, naturally, there will be provided more satellite base stations moving in orbit round the Earth sufficient to cover every area of the earth's is surface, and the earth switching centres are placed on the ground all important points in terrestrial telephone lines.

In the conventional mobile satellite communication system 50, however, since the satellite base stations 2a to 2c are moving along the orbits round the Earth, the location of the mobile station varies relatively when viewed from the satellite base stations 2a to 2c, even though the mobile station 1 is stationary. Thus, the location registration procedure is required whenever the satellite base station is substituted with another one, which will result in increased traffic for location registration.

SUMMARY OF THE INVENTION

The present invention was conceived to overcome the above disadvantages, and the object is to provide a mobile satellite communication system ensuring an effective execution of location registration through the monitoring of the location of a mobile station based on absolute terrestrial location data instead of relatively monitoring the location of the mobile station with respect to a satellite base station, and capable of suppressing an increase in traffic in communication lines due to frequent location registrations.

According to a first aspect of the present invention, a mobile satellite communication system comprises a mobile station movable on the Ground; a plurality of satellite base stations each moving along its orbit round the Earth and communicable with said mobile station located within its service area; said mobile station includes a registration means which detects its absolute location on the earth based on communication signals from said satellite base stations and registers thus detected its absolute location into a system monitor section.

According to a second aspect of the present invention, a mobile satellite communication system comprises a mobile station movable on the Ground; a plurality of satellite base stations each moving along its orbit round the Earth and communicable with said mobile station located within its service area; a GPS satellite; said mobile station includes a registration means which detects its absolute location on the earth based on communication signals from said satellite base stations and registers thus detected its absolute location into a system monitor section.

According to a third aspect of the present invention, a mobile satellite communication system comprises a mobile station movable on the ground; a plurality of satellite base stations each moving along its orbit round the Earth and communicable with said mobile station located within its service area; a plurality of earth'switching centres placed on the ground and constituting a communication network in cooperation with said satellite base stations; said plurality of switching centres each includes an identification data transmitter means for transmitting identification data corresponding to communication zone in which it lies; said switching centres being provided individually corresponding to said communication zones; said satellite base stations each includes an identification data transmitter means which, if one of said communication zones, transmits identification data received from said communication zones, transmits identification data received from said switching centre placed in said one of said communication zones to said mobile station lying within said one of said communication zones; said mobile station includes a registration means which detects a communication zone in which it lies based on communication signal containing said identification data from said satellite base stations and registers thus detected communication zone in which it lies into a monitor system.

According to a fourth aspect of the present invention, a mobile satellite communication system comprises a mobile station movable on the ground; a plurality of satellite base stations each moving along its orbit round the Earth and communicable with the mobile station located within its service area; said mobile stations includes a registration means which detects a terrestrial communication zone in which it lies based on zone identification data from a switching centre of a terrestrial mobile communication system provided on each of terrestrial communication zones which are allocated in advance in the terrestrial mobile communication system, and which informs a system monitor section of a location in which it lies by use of its identification data.

According to a fifth aspect of the present invention, a mobile satellite communication system comprises a mobile station movable on the ground; a plurality of satellite base stations each moving along its orbit round the Earth and communicable with said mobile station located within its service area; a plurality of earth switching centres placed on the ground and constituting a communication network in cooperation with said satellite base stations; said mobile stations includes a memory means for storing, as its location data, one of identification data corresponding to terrestrial communication zones which are allocated in advance on the ground in said terrestrial mobile communication system; a zone detection means for detecting a terrestrial communication zone in which it lies, based on zone identification data from a switching centre said terrestrial mobile communication system provided on each of said terrestrial communication zones; a location registration means which, if the detected communication zone is not coincident with the terrestrial communication zone associated with the identification data now being stored, updates said identification data being stored into the identification data corresponding to said detected terrestrial communication zone.

According to a sixth aspect of the present invention, a location registration method for registering data on the location of a mobile station into a monitor section of a mobile satellite communication system, comprising the steps of causing a mobile station to detect its absolute location on the earth based on communication signals from a plurality of satellite base stations; and registering thus detected absolute location into said monitor section.

According to a seventh aspect of the present invention, a location registration method for registering data of the location of a mobile station into a monitor section of a mobile satellite communication system, comprising the steps of causing said mobile station to detect its absolute location on the earth based on signals from a plurality of GPS satellites; and registering thus detected absolute location into said monitor unit.

According to an eighth aspect of the present invention, a location registration method for registering data on the location of a mobile station into a monitor section of a mobile satellite communication system, comprises the step of causing a switching centre to transmit identification data associated with a communication zone in which it lies to a plurality of satellite base stations; causing each of said satellite base stations to transmit said identification data received to a mobile station lying within a communication zone which it serves; causing said mobile station to receive said identification data transmitted from said satellite base stations to detect its communication zone; and causing said mobile station to register the communication zone detected in said defecting step into said monitor section.

According to a ninth aspect of the present invention, a location registration method for registering data on the location of a mobile station into a monitor section of a mobile satellite communication system, comprising the step of causing said mobile station to detect a terrestrial communication zone in which it lies based on signals from a switching centre provided on each of terrestrial communication zones which are allocated in advance on the ground in a terrestrial mobile communication system; and registering its location into said monitor section by use of identification data associated with detected communication zone.

In this invention, a plurality of satellite base stations communicable with the mobile station lying in their respective management areas and movable along the orbits round the Earth are each provided with a transmitter means for transmitting a communication signal including data about the absolute location on its orbit round the Earth. The location registration for the mobile station is loaded into the monitor section of this system, by means of the absolute terrestrial location data on the mobile station which are obtained in the mobile station based on the absolute location data received from the satellite base station managing the mobile station. Thus, irrespective of the positional relationship between the satellite base stations and the mobile station which may vary relatively, the location registration procedure is required only when the mobile station itself is displaced on the ground, which ensures an effective execution of the location registration, thereby suppressing an increase of traffic in the communication lines arising from the frequent location registrations.

Furthermore, in this invention, the mobile station movable on the ground further includes a GPS receiver for receiving radio waves from the satellites constituting the Global Positioning System. The location registration of the mobile station is loaded into the monitor of this system, by means of the absolute terrestrial location data of the mobile station which are derived in the mobile station based on the output issued from the GPS receiver. Thus, in the same manner as the above, regardless of the relative relationship between the satellite base stations and the mobile station which may vary relatively, the location registration procedure is required to be carried out only when the mobile station itself is moved on the ground. Additionally, the communication facilities of the satellite base station and the earth switching centres remain intact, thus suppressing the increase of traffic in the communication lines caused by the frequent location registrations for the mobile station without requiring any specification change in the communication facilities of the satellite base stations or the earth switching centres.

Furthermore, in this invention, the earth switching centres are correspondingly provided in the communication zones of this system which are allotted in advance on the ground. Each of the earth switching centres is equipped with an identification data transmitter means for transmitting the identification data associated with the communication zone in which it lies. On the other hand, the satellite base stations are each provided with an identification data transmitter means which if the management area following each of the satellite base stations falls into a predetermined one of the communication zones, transmits the identification data from the earth switching centre lying within the communication zone to the mobile station lying within the communication zone. The location registration of the mobile station is loaded into the monitor section of this system, by means of its absolute terrestrial location data which are obtained in the mobile station based on the identification data on the communication zone derived from the earth switching centres through a relay at the satellite base station. In consequence, as in the above, the location registration procedure is needed only when the mobile station itself is displaced on the ground, irrespective of relative variation in the positional relationships between the satellite base stations and the mobile station. This will lead to a reduction in the increase of traffic in the communication lines due to the frequent location registrations for the mobile station, without requiring any change in specifications on the communication facilities of the satellite base stations since their specifications remain intact.

Moreover, in this invention, the location registration of the mobile station is loaded into the monitor section of this mobile satellite communication system, by means of its absolute terrestrial location data which are obtained in the mobile station based on the zone identification data derived from the earth switching centres of the terrestrial mobile communication system which are provided correspondingly to the terrestrial communication zones. Thus, there can be prevented an increase of the traffic in the communication lines due to the frequent location registrations for the mobile station, without requiring any specification change in the communication facility of the satellite base station or the earth switching centres.

DESCRIPTION OF THE PREFERRED EMBODIMENTS

Embodiment 1

Figure 1:
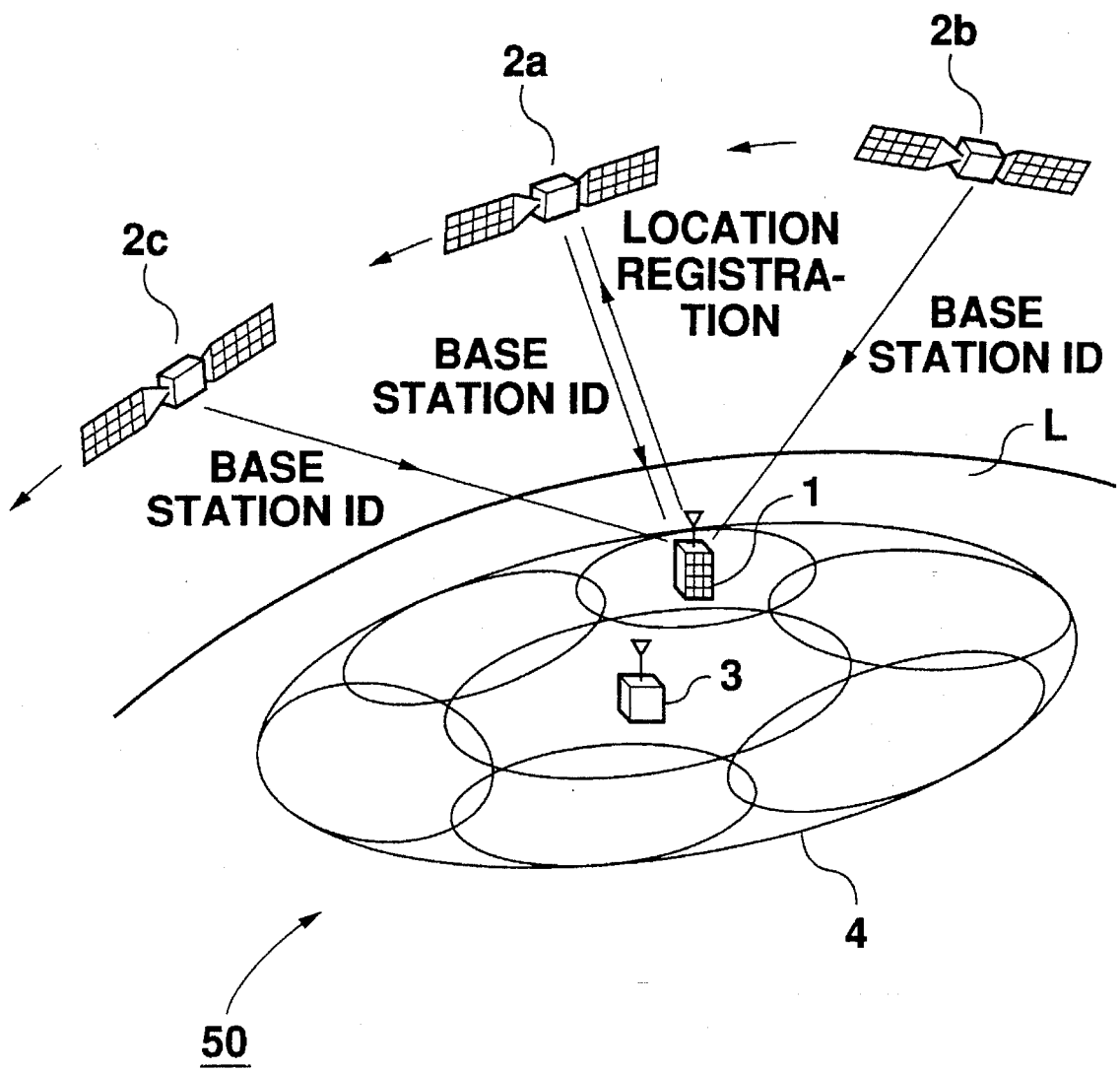
FIG. 1 is a diagrammatic view showing a configuration of a conventional mobile satellite communication system.
Figure 2:
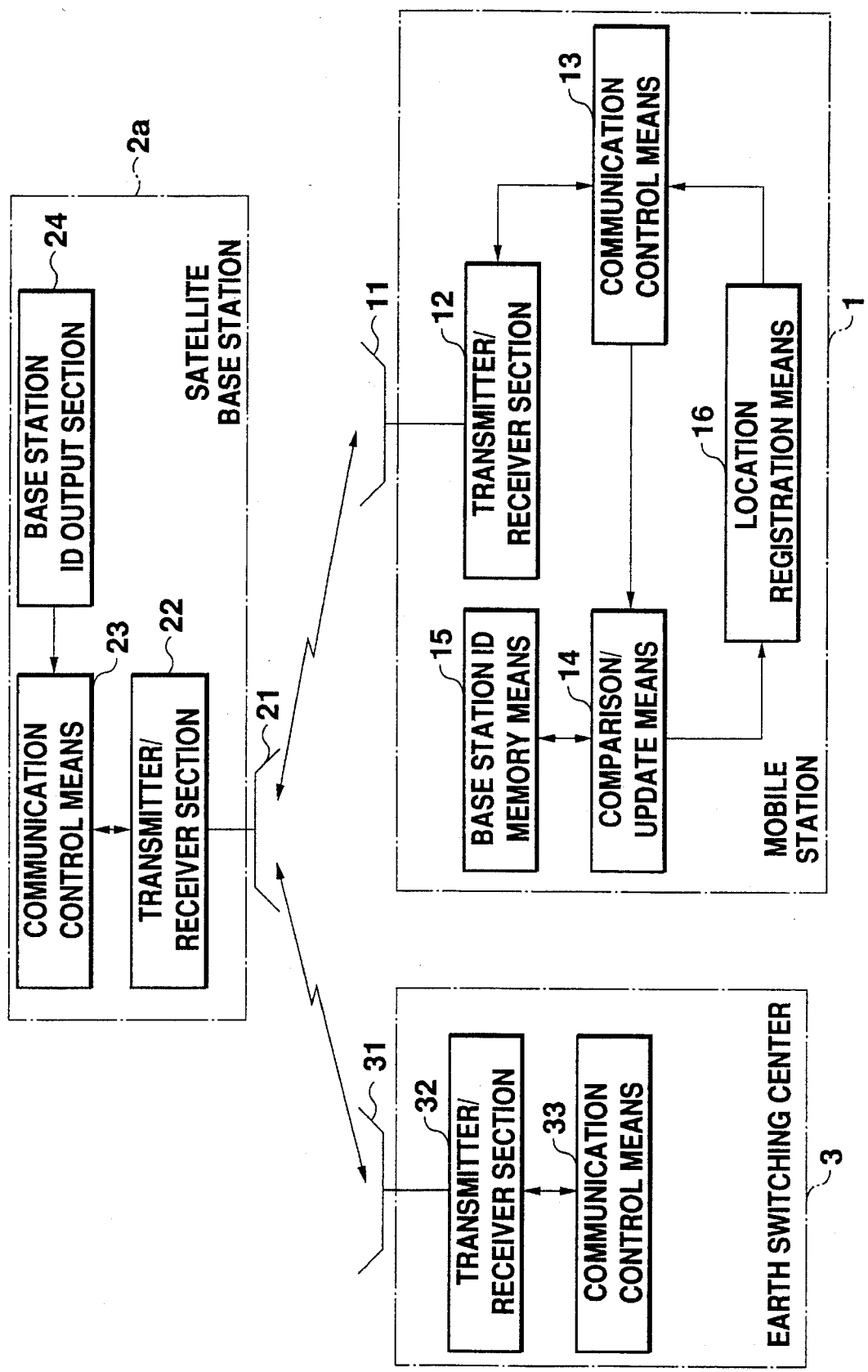
FIG. 2 is a diagram showing a functional block of a mobile station, a satellite base station, and an earth switching centre, which constitute the conventional mobile satellite communication system.
Figure 3:
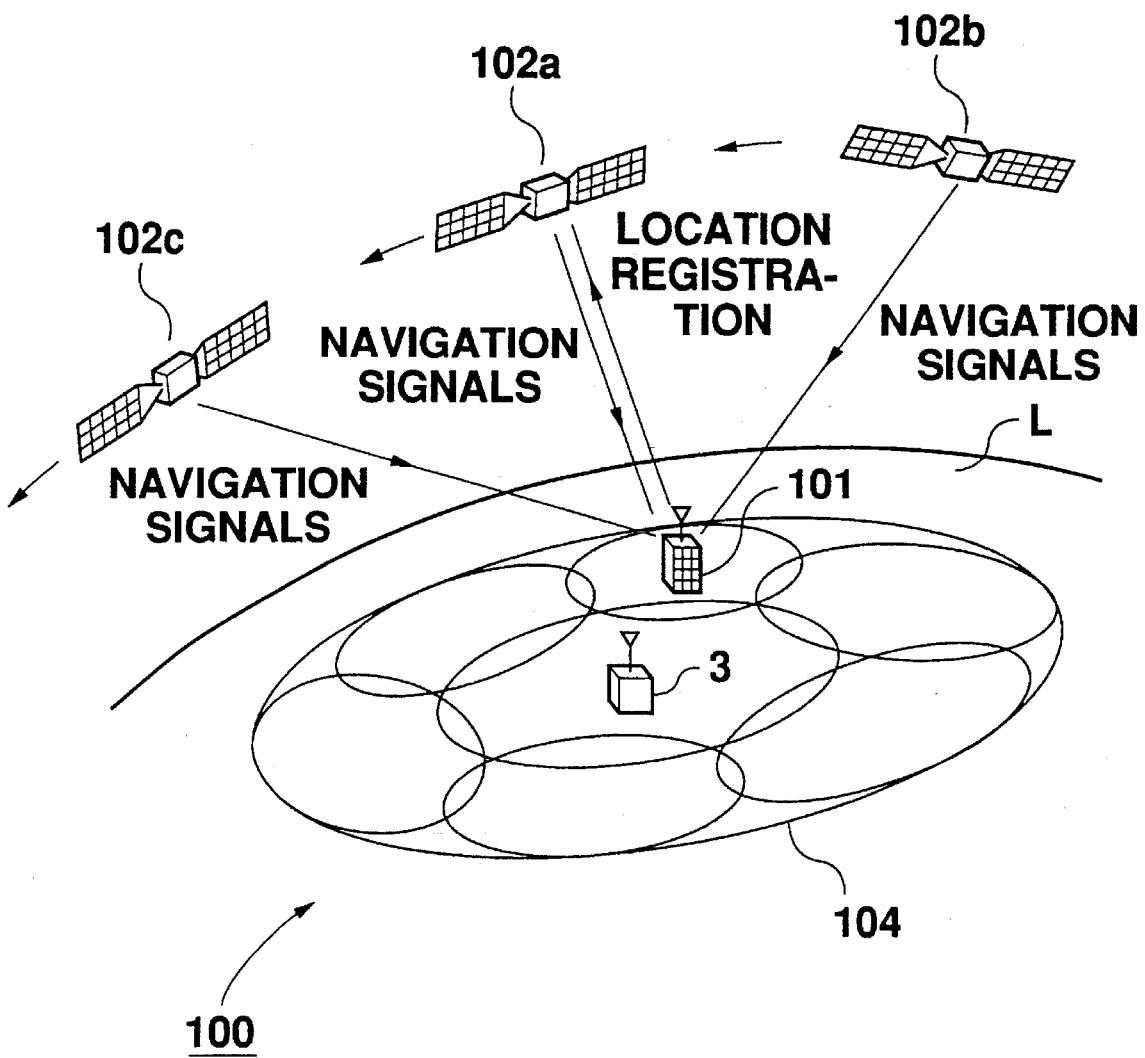
FIG. 3 is diagrammatic view showing a configuration of a mobile satellite communication system in accordance with a first embodiment of the present invention.
Figure 4:
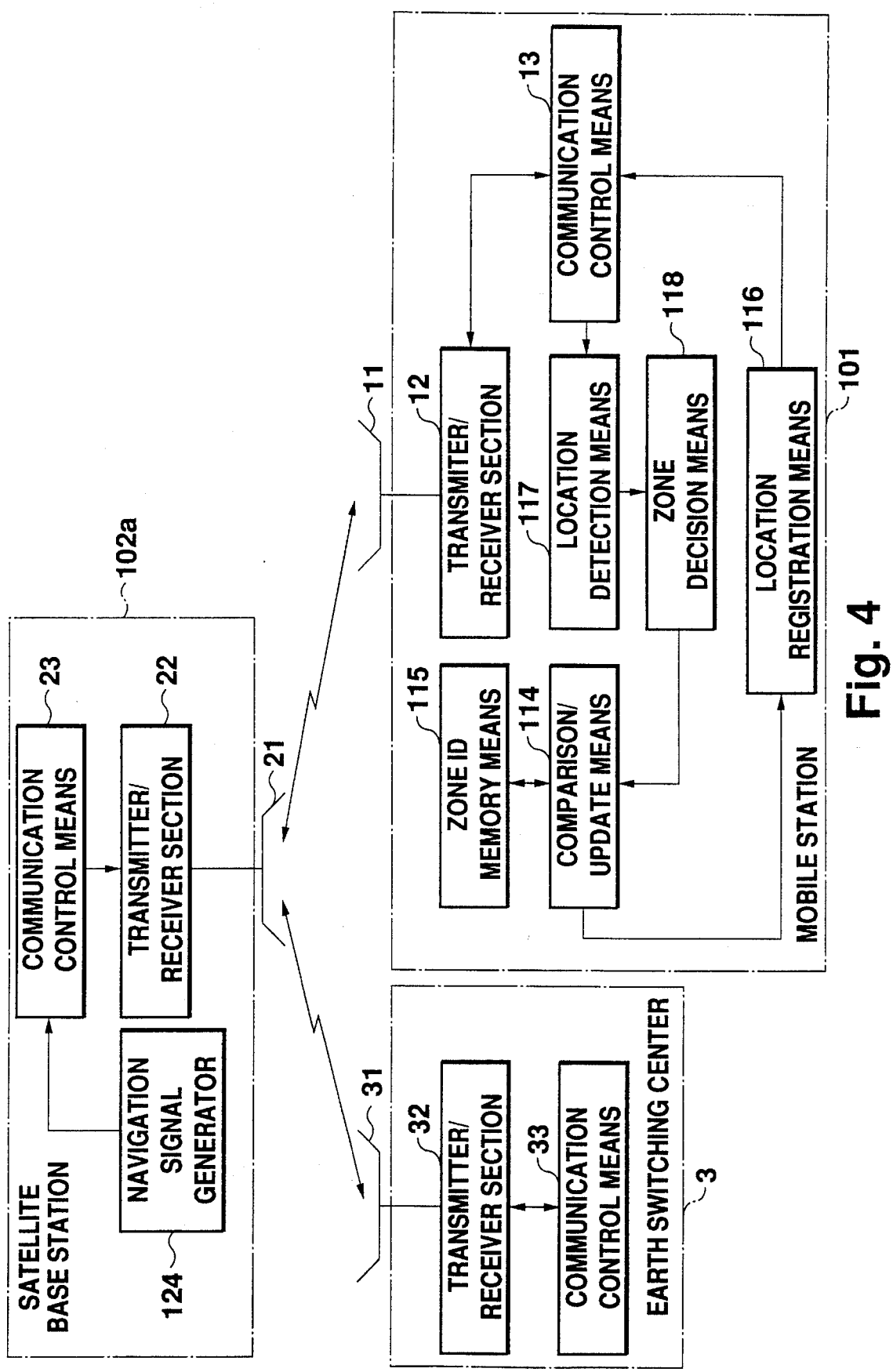
FIG. 4 is a diagram showing a functional block of a mobile station, a satellite base station, and an earth switching centre, which constitute the mobile satellite communication system of FIG. 3.

FIG. 3 is a diagram showing a configuration of a mobile satellite communication system constructed and arranged in accordance with a first embodiment of the present invention, while FIG. 4 is a diagram showing a functional block of a mobile station, a satellite base station, and an earth switching centre, which constitute the mobile satellite communication system.

Referring first to FIG. 3, reference numeral 100 denotes a mobile satellite communication system of this embodiment, which comprises a mobile station 101, capable of moving on the ground L, a plurality of satellite base stations, 102a to 102c moving in an orbit round the Earth and communicable with the mobile station 101 located within their control area, and a plurality of earth switching centres 3 placed on the ground L and establishing a communication network in cooperation with the satellite base stations 102a to 102c. Based on its absolute terrestrial location data, the mobile station 101 passes a location registration to a monitor section (not shown) of this system 100. The monitor section is provided in the predetermined earth switching centres constituting the communication network so as to monitor the mobile station 101 moving on the ground L and the satellite base stations 102a to 102c moving along its orbit (not shown) round the Earth.

Referring next to FIG. 4, the satellite base stations 102a to 102c each includes a transmitter/receiver section 22, a communication control means 23, and a navigation signal generator (or a transmitting means) 124 for transmitting communication signals involving information on the absolute location in its orbit round the Earth, for example, navigation signals for use in GPS (Global Positioning System).

The mobile station 101 includes a transmitter/receiver section 12, a communication control means 13, a zone ID memory means 115, a location detection means 17, and a zone decision means 118. The zone ID memory means 115 stores, as information on the location of the mobile station 101, one of identification data (or communication zone ID's) corresponding to communication zones in this system 100 which are previously allotted to the ground. The location detection means 117 detects its absolute terrestrial location, based on communication signals transmitted from the three satellite base stations signals transmitted from the three satellite base stations 102a to 102c. The zone decision means 118 determines which one it lies in at present of all the communication zones of this system, based on an output from the location detection means 117.

The mobile station 101 further includes a comparison/update means 114 and a location registration means 116. The comparison/update means 114 compares the communication zone ID being stored with the communication zone ID transmitted from the satellite base station now in contact, and, if they do not coincide with each other, updates the communication zone ID within the memory means 115 into the communication zone ID from the satellite base station now being in communication therewith. The location registration means 116 receives a noncoincidence output from the comparison/update means 16, and transmits the communication zone ID derived from the communicating satellite base station to the transmitter/receiver section 12 by way of the communication control means 13. The other arrangement is substantially the same as that in the conventional mobile satellite communication system 50.

The action of this system will be described hereinbelow.

In this mobile satellite communication system 100, the mobile station 101 is first energized to initiate a communication with the satellite base station 102a covering a control cell 104 within which the mobile station 101 lies. At that time, the location detection means 117 detects its absolute terrestrial location based on the communication signals descending from the satellite base station 102a, while the zone ID decision means 118 determines which one it lies in of all the communication zones of this system based on the output from the location detection means 117.

Then, in the comparison/update means 114, the ID associated with the thus determined communication zone is compared with the communication zone ID now being stored in the communication zone ID memory means 115. If they are not coincident with each other, the location registration means 116 receives a noncoincidence output, and issues a signal representing the determined communication zone ID with the mobile station ID to the transmitter/receiver section 12 over the communication control means 13. The transmitter/receiver section 12 in turn transmits the determined communication zone ID thus received, as location data update request with respect to the mobile station 101, to the satellite base station 102a.

When the satellite base station 102a receives data on the absolute location of the mobile station 101 in this manner, the absolute location data are registered within the monitor section of this system by way of the communication network of this system 100 for the execution of a location registration procedure.

Afterwards, in receiver mode, the mobile station 101 may be managed by other satellite base station, according to the movement of the satellite base station 101 on the ground and movements of the satellite base stations 102a to 102c along the orbit round the Earth. It is to be appreciated that the same location registration procedure as the above can be carried out only when the determined communication zone ID received by the mobile station 101 differs from the communication zone ID being stored within the memory means 115 of the mobile station 101.

Thus, after energizing the mobile station 100, its absolute terrestrial location is constantly monitored by the monitor section of this system.

For instance, when the mobile station 101 receives a call from a Ground telephone line (not shown), the monitor section of this system calls the mobile station 101 by way of the satellite base station 102a corresponding to the control cell 4 in which the mobile station 101 is located at that time, over the communication network which links the earth switching centres 3 provided at various points on the earth with the satellite base stations 102a to 103c, thereby connecting the ground telephone line to the mobile station 101.

In this embodiment, as described above, the satellite base stations 102a to 102c are each equipped with the navigation signal generator 124. On the other hand, the mobile station 101 detects its absolute terrestrial location based on a navigation signal received from each of the satellite base station, and executes a location registration procedure by use of identification data (or communication zone ID) corresponding to the communication zone in which it lies, which zone is derived from the thus detected absolute location data. Thus, the monitoring on the location of the mobile station is carried out by means of the data associated with its absolute location, instead of relative positional relationship between the mobile station and the satellite base stations. In other words, the location registration is effected only when the mobile station 101 is moved from one communication zone to the other communication zone, thereby ensuring an effective execution of the location registration without causing any excessive increase in communication traffic.

Figure 5:
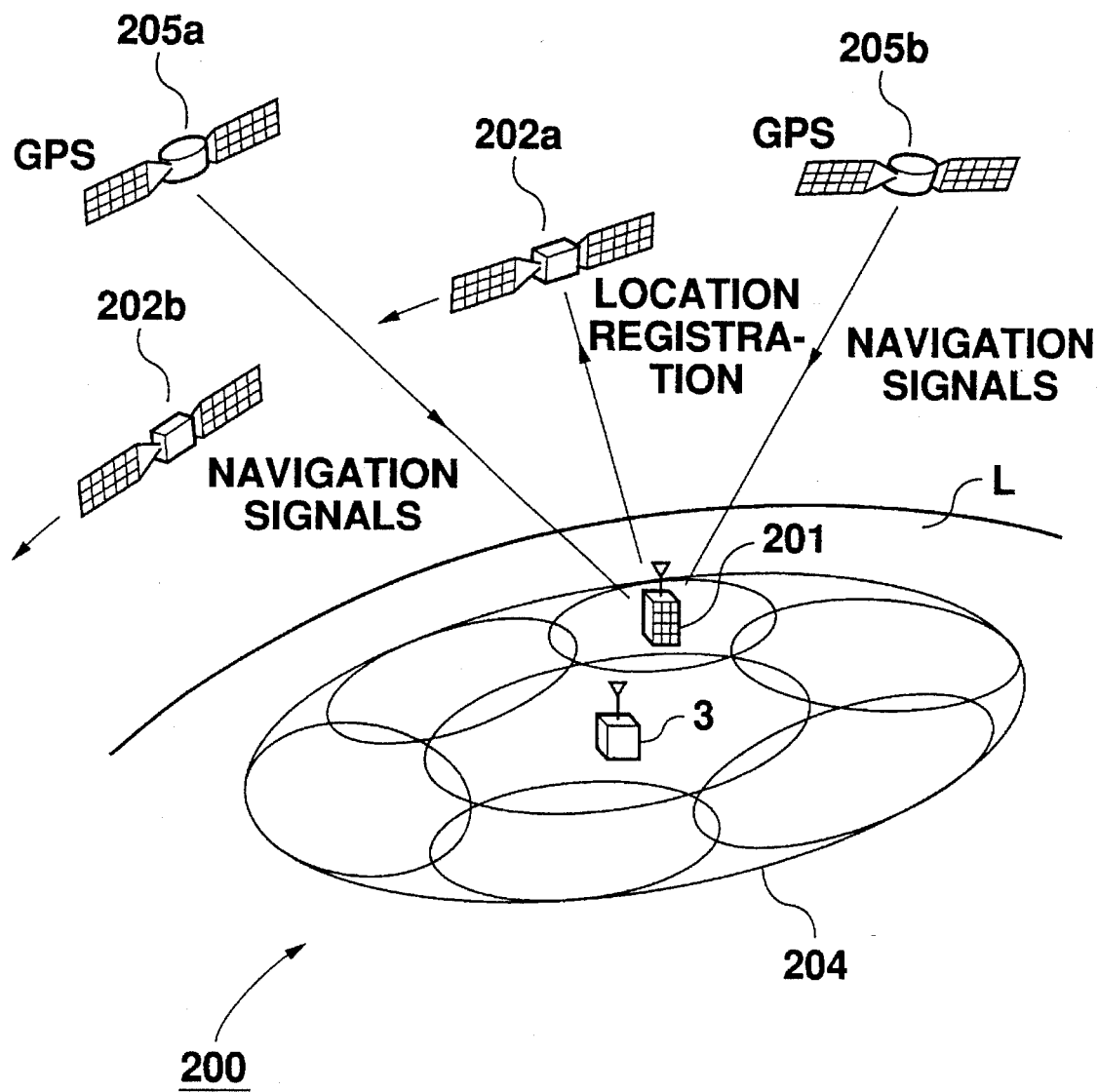
FIG. 5 is a diagrammatic view showing a configuration of a mobile satellite communication system in accordance with a second embodiment of the present invention.
Figure 6:
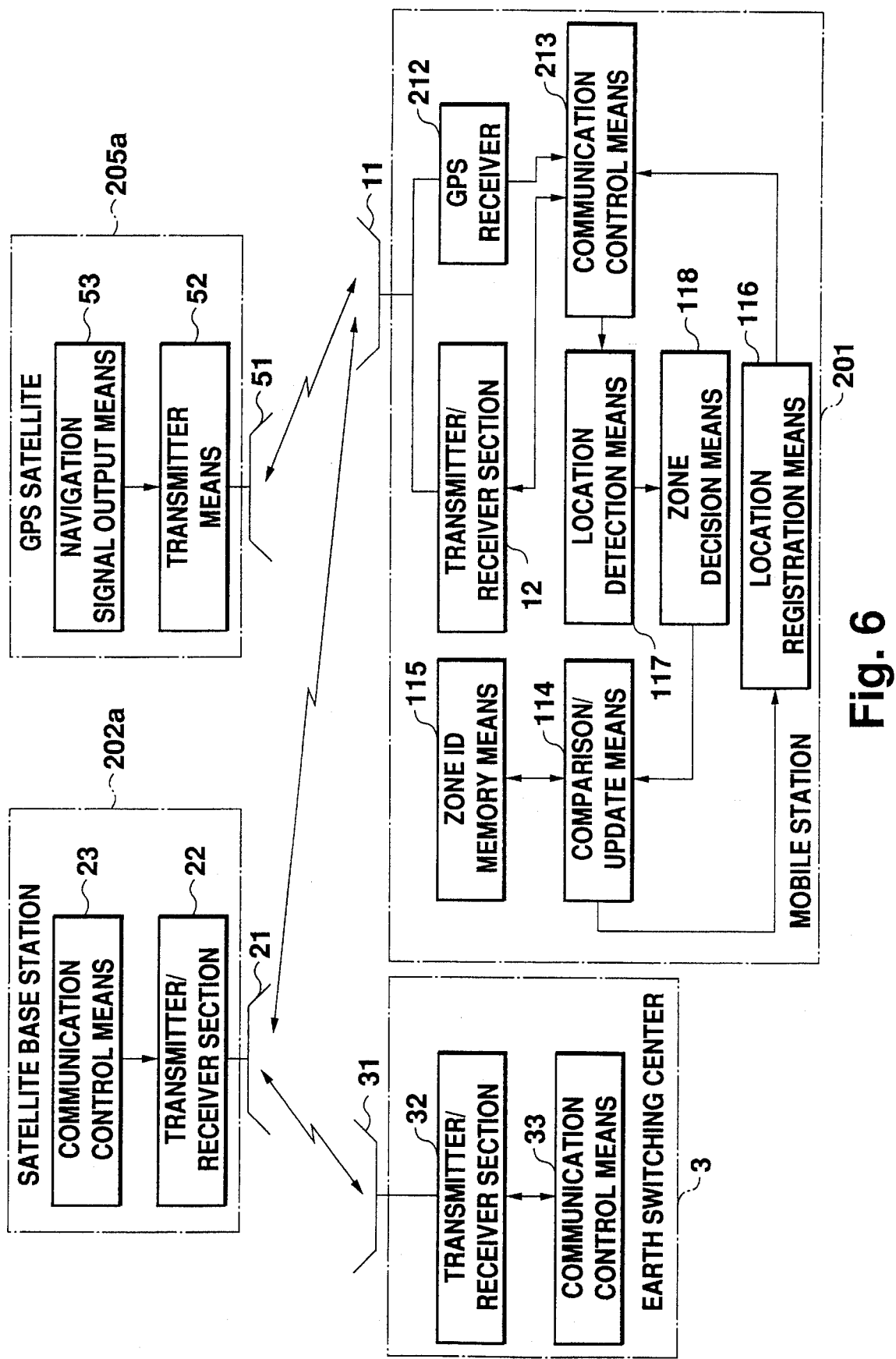
FIG. 6 is a diagram showing a functional block of a mobile station, a satellite base station, and an earth switching centre, which constitute the mobile satellite communication system of FIG. 5.

FIG. 5 illustrates a configuration of a mobile satellite communication system in accordance with a second embodiment of the present invention, while FIG. 6 is a functional block diagram showing constituent elements of the mobile satellite communication system, that is, a mobile station, a satellite base station, and an earth switching centre, each being exemplarily shown independently. In the diagrams, a mobile satellite communication system of the present invention generally designated at 200 comprises a mobile station 201, a plurality of satellite base station 202a, to 202c, and plurality of earth switching centres 3. In the same manner as the first embodiment, the mobile station 201 passes a location registration on a monitor section (not shown) based on its absolute terrestrial location data.

In addition to the arrangement of the mobile station 101 shown in the first embodiment, the mobile station 201 further includes a GPS receiver 212 intended to receive a radio wave from GPS system satellites 205a, 205b constituting a Global Positioning System, the absolute terrestrial location of the mobile station 201 being detected based on the output from the GPS receiver 212.

The GPS system satellite 205a includes an output means 53 for issuing a navigation signal, and a transmitter section 52 having an antenna 51 through which navigation signals are transmitted to the ground L. The satellite base station 202a has substantially the same configuration as that of the satellite base station 102a of the first embodiment, except that the navigation signal generator 124 is removed.

In lieu of allowing navigation signals to be contained within signals descending from the satellite base stations 102a to 102c as in the first embodiment, the mobile station 201 of the thus configured second embodiment further includes a receiver 212 for GPS, based on which output there is obtained an absolute terrestrial location data on the mobile station, thereby effecting its location registration into the monitor section of the system. Thus, as in the above, irrespective of a possible relative variation in positional relationships between the mobile station 201 and the satellite base stations 202a to 202c, the location registration procedure need be executed only when the mobile station itself moves on the ground. This also simplifies specifications of the communication facilities in the satellite base stations 202a to 202c, while leaving specifications of the communication facilities in the earth switching centres 3 intact, thus suppressing any excessive increase of the communication traffic in the communication line arising from frequent location registrations for the mobile station 201, without causing any complexity in the communication facilities in the satellite base stations and earth switching centres.

Embodiment 3

Figure 7:
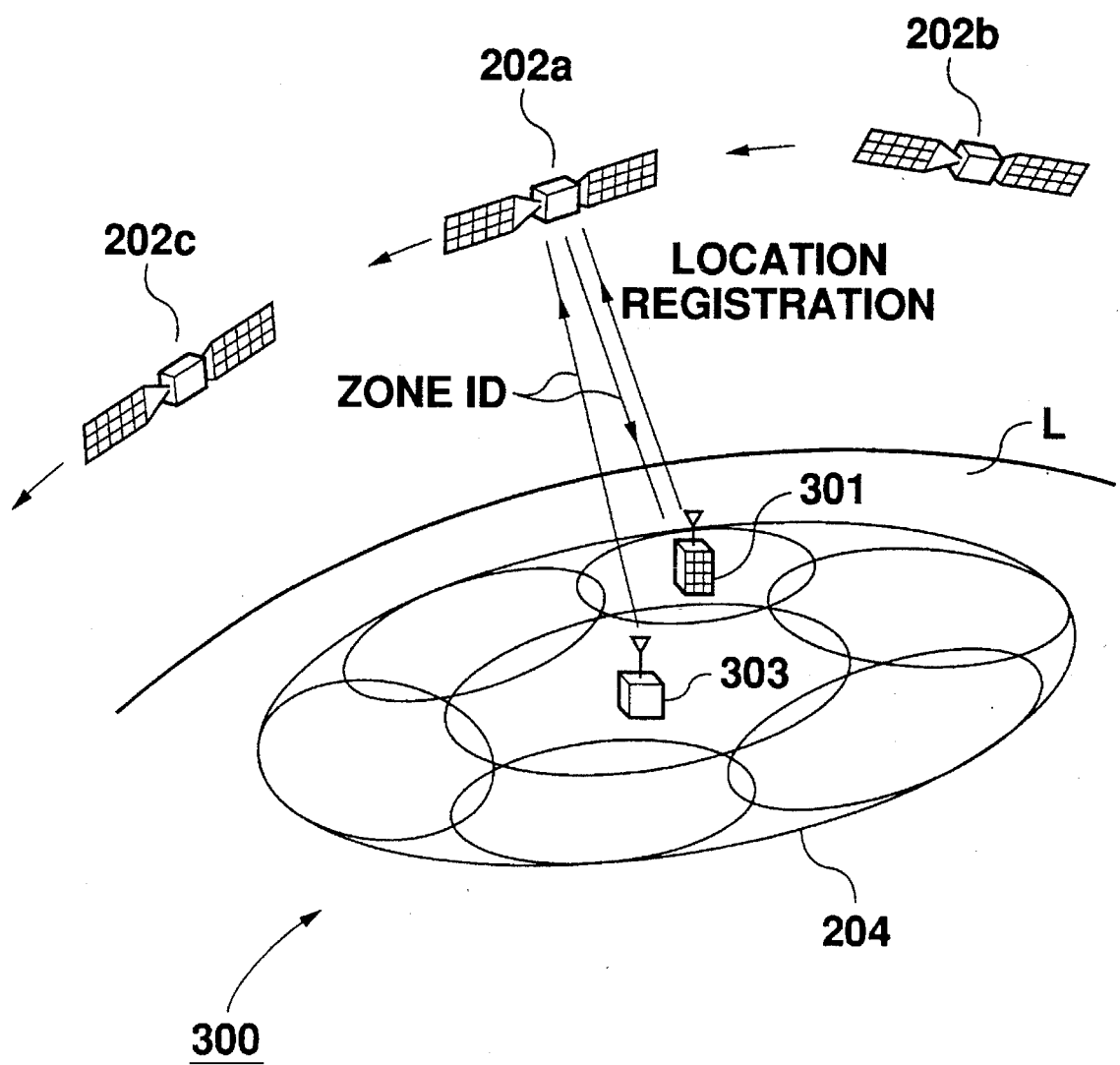
FIG. 7 is a diagrammatic view showing a configuration of a mobile satellite communication system in accordance with a third embodiment of the present invention.
Figure 8:
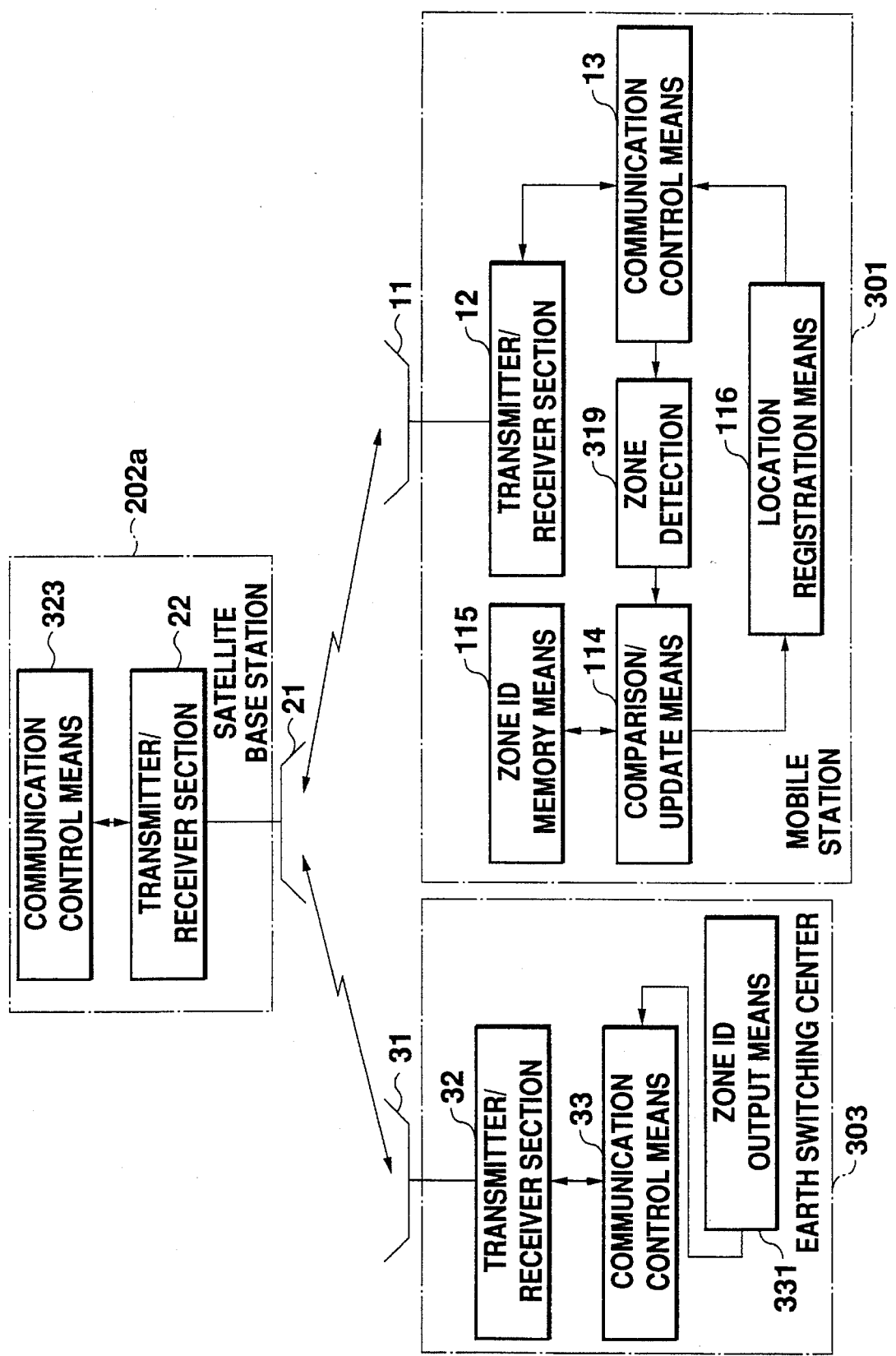
FIG. 8 is a diagram showing a functional block of a mobile station, a satellite base station, and an earth switching centre, which constitute the mobile satellite communication system of FIG. 7.

FIG. 7 is a diagram showing a configuration of a mobile satellite communication system according to a third embodiment of the present invention. FIG. 8 is a diagram showing a functional block of a mobile station, a satellite station, and an earth switching centre, which constitute in cooperation the mobile satellite communication system. It will be understood that each constituent element is shown individually for illustrative purpose only. In the diagrams, reference numeral 300 denotes a mobile satellite communication system of this embodiment which comprises a plurality of earth switching centres 303 individually corresponding to a plurality-of communication zones in this system which are allotted in advance on the ground. Each of the earth switching centres includes not only a transmitter/receiver section 32 and a communication control means 33 but also a zone ID output section 331 for outputting identification data (or communication zone ID) associated with the communication zone in which it lies.

In this embodiment, a communication control means 323 involved in a satellite base stations 202a is so adapted that when a service area following the satellite base station 202a falls into a predetermined communication zone, it transfers a communication zone ID received from the earth switching centre 303 which lies in the communication zone to the mobile station 301 located within the communication zone.

The mobile station 301 further includes a zone detection means 319 instead of the location detection means 117 and the zone ID decision means 118 employed in the mobile station 101 of the first embodiment, the zone detection means 319 detecting a communication zone in which it lies based on a communication ID signal from the earth switching centre 303, which is transferred from the satellite base station 202a. If the detected communication zone is different from the communication zone associated with the communication zone ID now being stored, the communication zone ID corresponding to the detected communication zone is used to perform the location registration, and the communication zone ID being stored is updated into the ID associated with the detected communication zone.

The action of this embodiment will be described hereinbelow.

In the mobile satellite communication system 300 of this embodiment, the earth switching centre 303 is provided for each of the zones of this system which are allotted in advance on the ground. When the service area of the satellite base station 202a falls into a predetermined communication zone, the satellite base station 202a receives a communication zone ID issued from the earth switching centre 303 covering the predetermined communication zone and then transfers it to the mobile station 301 lying within the communication zone and then transfers it to the mobile station 301 lying within the communication zone. Therefore, as in the above embodiment, irrespective of a relative variation in positional relationship between the satellite base stations and the mobile station, the location registration procedure is required only when the mobile station itself moves on the ground. In addition, since the satellite base station merely acts to transfer the communication zone ID received from the earth switching centre to the mobile station 301, the increase of the traffic in the communication line arising from frequent location registrations for the mobile station can be suppressed without largely changing the specifications of the communication facilities.

Embodiment 4

Figure 9:
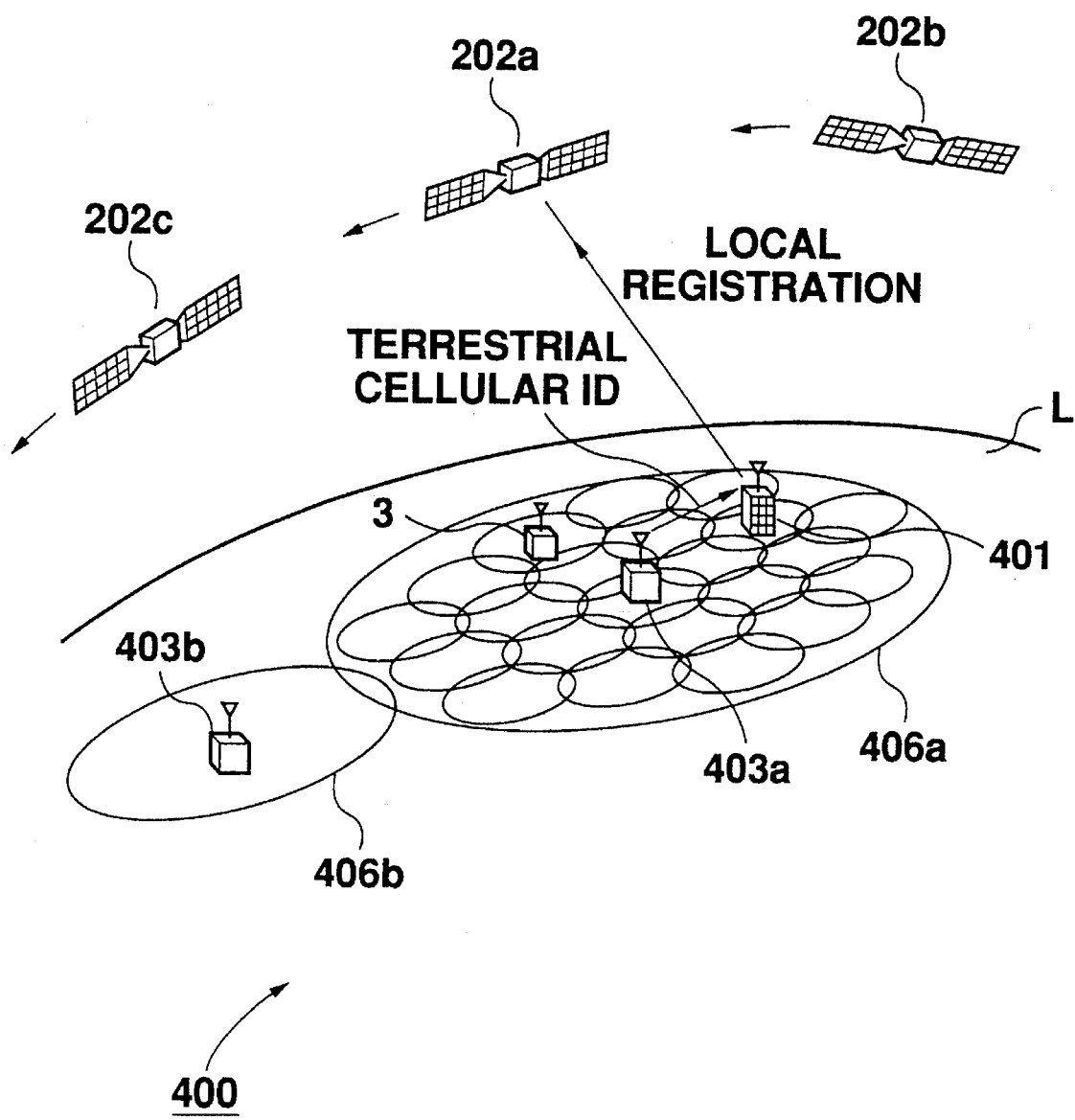
FIG. 9 is a diagrammatic view showing a configuration of a mobile satellite communication system in accordance with a fourth embodiment of the present invention.
Figure 10:
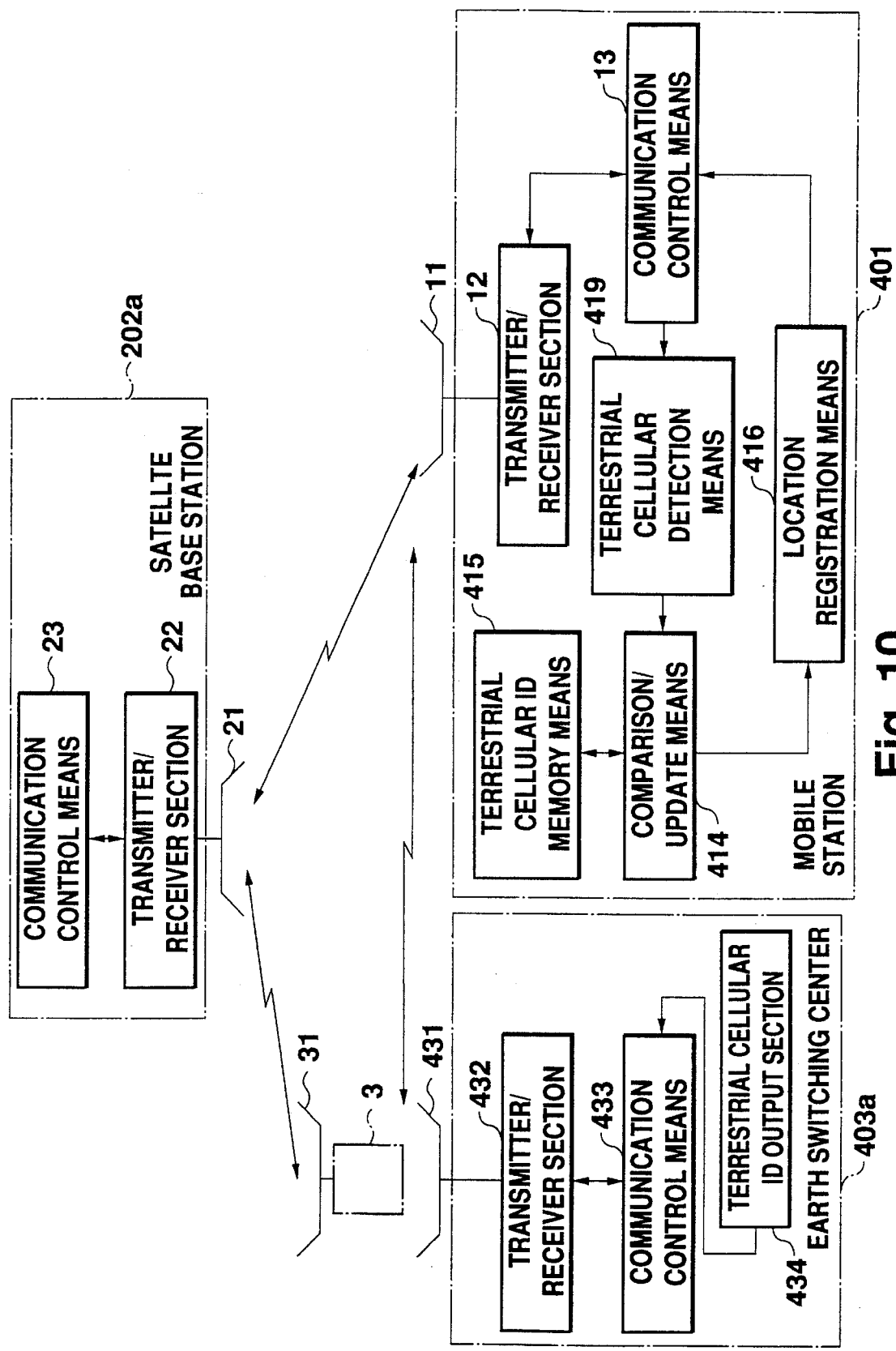
FIG. 10 is a diagram showing a functional block of a mobile station, a satellite base station, and an earth switching centre, which constitute the mobile satellite communication system of FIG. 9.

FIG. 9 depicts a configuration of a mobile satellite communication system according to a fourth embodiment of the present invention, while FIG. 10 is a functional block diagram showing a mobile station, satellite base station, and an earth switching centre, which constitute the mobile satellite communication system. In the diagrams, identical parts to those in FIG. 6 are designated by similar reference numerals. A mobile satellite communication system generally designated at 400 comprises a mobile station 401, a plurality of satellite base stations 202a to 202c, and a plurality of earth switching centres. As in the first embodiment, a mobile station 401 loads its location registration into a monitor section (not shown) of this system, based on its absolute terrestrial location data.

The mobile station 401 includes a terrestrial cellular ID memory means 415 and a terrestrial cellular detection means 419. The memory means 415 stores, as its location data, one of identification data (terrestrial cellular ID) corresponding to terrestrial communication zones (terrestrial cellulars) 406a, 406b which are previously allotted on the ground in the terrestrial mobile communication system. The detection means 419 detects the terrestrial communication zone in which it lies, based on the zone identification data received from earth switching centres 431 of the terrestrial mobile communication system which are provided correspondingly to the terrestrial communication zones. The mobile station 401 further includes a comparison/update means 414 and a location registration means 416. The comparison/update means 414 compares the thus detected terrestrial communication zone ID with the terrestrial communication zone ID now being stored, and, if they are not coincident, updates the terrestrial communication zone ID within the memory means 415 into the detected terrestrial communication zone ID. The location registration means 416 receives a comparison noncoincidence output from the comparison/update means 414, and transmits the detected terrestrial communication zone ID to the transmitter/receiver section 12 by way of the communication control means 13.

The switching centre 403a of the terrestrial cellular system includes transmitter/receiver section 432 connected to an antenna 431, a communication control means 433 for controlling the signal transmitted and received through this switching centre, and an output transmitter/receiving section 432 by way of the communication control means 433.

In the thus configured fourth embodiment, the mobile satellite communication system is utilized in cooperation with the terrestrial mobile communication system so that its location registration is loaded into the monitor section of this mobile satellite communication system by means of the terrestrial cellular ID received from the terrestrial switching centres 403a, 403b of the terrestrial mobile communication system which are provided correspondingly to the terrestrial communication zones, thus preventing the increasing of the traffic in the communication line arising from the frequent location registrations for the mobile stations without requiring any change in specifications of the communication facilities of the satellite base station or the terrestrial base stations.

The communication zone ID of the terrestrial system may be regarded as the communication ID in the mobile satellite communication system 400 to perform the location management. This enables a simultaneous location registration to be carried out in the mobile satellite communication system by executing the location registration for the mobile station 401 within the terrestrial system.

As described in detail above, according to the mobile satellite communication system of the present invention, a plurality of satellite base stations communicable with the mobile station lying in their respective management areas and movable along the orbits round the Earth are each provided with a transmitter means for transmitting a communication signal including data about the absolute location on its orbit round the Earth. The location registration for the mobile station is loaded into the monitor section of this 'system, by means of the absolute terrestrial location data in the mobile station which are obtained in the mobile station based on the absolute location data received from the satellite base station managing the mobile station. Thus, irrespective of the positional relationship between the satellite base stations and the mobile station which may vary relatively, the location registration procedure is required only when the mobile station itself is displayed in the ground, which ensures an effective execution of the location registration, thereby suppressing an increase of traffic in the communication lines arising from the frequent location registrations.

According to the mobile satellite communication system of the present invention, the mobile station movable on the ground further includes a GPS receiver for receiving radio waves from predetermined one(s) of the satellites constituting the Global Positioning System. The location registration of the mobile station is loaded into the monitor of this system, by means of the absolute terrestrial location data of the mobile station which are derived in the mobile station based on the output issued from the GPS receiver. Thus, in the same manner as the above, regardless of the relative relationship between the satellite base stations and the mobile station which may vary relatively, the location registration procedure is required to be carried out only when the mobile station itself is moved on the ground. Additionally the communication facilities of the satellite base stations are simplified while leaving the communication facilities of the earth switching centre intact, thus suppressing the increase of traffic in the communication lines caused by the frequent location registration for the mobile caused by the frequent location registrations for the mobile station without increasing s complexity in the communication facilities of the satellite base stations or the earth switching centres.

According to the mobile satellite communication system of the present invention, the earth switching centres are correspondingly provided in the communication zones of this system which are allotted in advance on the ground. Each of the earth switching centres is equipped with an identification data transmitter means for transmitting the identification data associated with the communication zone in which it lies. On the other hand, the satellite base stations are each provided with an identification data transmitter means which if the management area following each of the satellite base station falls into a predetermined one of the communication zones, transmits the identification data from the earth switching centre lying within the communication zone to the mobile station lying within the communication zone. The location registration of the mobile station is loaded into the monitor section of this system, by means of its absolute terrestrial location data which are obtained in the mobile station based on the identification data on the communication zone derived from the earth switching centres through a relay at the satellite base station. This will lead to a reduction in the increase of traffic in the communication lines due to the frequent location registrations for the mobile station, without causing any change in the specifications on the communication facilities of the satellite base station.

According to the mobile satellite communication system of the present invention, the location registration of the mobile station is loaded into the monitor section of this mobile satellite communication system, by means of its absolute terrestrial location data which are obtained in the mobile station based on the zone identification data derived from the earth switching centres of the terrestrial mobile communication system which are provided correspondingly to the terrestrial communication zones. Thus, the increase of the traffic in the communication line, due to the frequent location registrations for the mobile station, can be prevented without requiring any specification change in the communication facility of the satellite base station or the earth switching centres.

What is claimed is:

1. A mobile satellite communication system comprising:
   (a) a mobile station movable on the ground; and
   (b) a plurality of satellite base stations each moving along its orbit round the earth and communicable with said mobile station located within its service area;
   said mobile station including:
   (c) a registration means which detects its absolute location on the earth based on communication signals from said satellite base stations and registers thus detected its absolute location into a system monitor section;
   (d) a memory means for storing, as its location data, one of identification data corresponding to communication zones which are allocated in advance on the ground;

(e) a location detection means for detecting its absolute location on the Earth, based on signals from said satellite base stations;

(f) a zone decision means for determining which communication zone it lies in of all of said communication zones, based on an output from said location detection means; and (g) a location registration means which, if the determined communication zone is not coincident with the communication zone associated with the identification data now being stored, loads into a system monitor section a location registration for permitting its location to be accessed, by use of the identification data corresponding to said determined communication zone.

2. A mobile satellite communication system according to claim 1, wherein said mobile station further comprises:

(h) an update means which, if said determined communication zone is not coincident with said communication zone associated with said identification data now being stored, updates said identification data being stored into the identification data corresponding to said determined communication zone.

3. A mobile satellite communication system comprising:

(a) a mobile station movable on the ground;

(b) a plurality of satellite base stations each moving along its orbit round the Earth and communicable with said mobile station located within its service area; and (c) a plurality of switching centers placed on the ground and constituting a communication network in cooperation with said satellite base stations;

said plurality of satellite base stations each including (d) a transmitter means for transmitting communication signals containing its absolute location data on its orbit round the Earth;

said mobile station including:

(e) a memory means for storing, as its location data, one of identification data corresponding to communication zones which are allocated in advance on the Ground;

(f) a location detection means for detecting its absolute location on the Earth, based on signals from said satellite base stations;

(g) a zone decision means for determining which communication zone it lies in of all of said communication zones, based on an output from said location detection means;

(h) a location registration means which, if the determined communication zone is not coincident with the communication zone associated with the identification data now being stored, loads into a system monitor section a location registration for permitting its location to be accessed, by use of the identification data corresponding to said determined communication zone; and (i) an update means which, if said determined communication zone is not coincident with said communication zone associated with said identification data now being stored, updates said identification data being stored into the identification data corresponding to said determined communication zone.

4. A mobile satellite communication system comprising:

(a) a mobile station movable on the ground;

(b) a plurality of satellite base stations each moving along its orbit round the earth and communicable with said mobile station located within its service area; and (c) a GPS satellite;

said mobile station including:

(d) a registration means which detects its absolute location on the earth based on communication signals from said satellite base stations and registers thus detected its absolute location in a system monitor section;

(e) a memory means for storing, as its location data, one of identification data corresponding to communication zones which are allocated in advance on the ground;

(f) a location detection means for detecting its absolute location on the Earth, based on signals from said satellite base stations;

(g) a zone decision means for determining which communication zone it lies in of all of said communication zones, based on an output from said location detection means; and (h) a location registration means which, if the determined communication zone is not coincident with the communication zone associated with the identification data now being stored, loads into a system monitor section a location registration for permitting its location to be accessed, by use of the identification data corresponding to said determined communication zone.

5. A mobile satellite communication system according to claim 4, wherein said mobile station further comprises:

(i) an update means which, if said determined communication zone is not coincident with said communication zone associated with said identification data now being stored, updates said identification data being stored into the identification data corresponding to said determined communication zone.

6. A mobile satellite communication system comprising:

(a) a mobile station movable on the ground;

(b) a plurality of satellite base stations each moving along its orbit round the Earth and communicable with said mobile station located within its service area;

(c) a plurality of switching centers placed on the ground and constituting a communication network in cooperation with said satellite base stations; and (d) a GPS satellite;

said mobile station including:

(e) a memory means for storing, as its location data, one of identification data corresponding to communication zones which are allocated in advance on the ground;

(f) a location detection means for detecting its absolute location on the Earth, based on signals from said satellite base stations;

(g) a zone decision means for determining which communication zone it lies in of all of said communication zones, based on an output from said location detection means;

(h) a location registration means which, if the determined communication zone is not coincident with the communication zone associated with the identification data now being stored, loads into a system monitor section a location registration for permitting its location to be accessed, by use of the identification data corresponding to said determined communication zone; and (i) an update means which, if said determined communication zone is not coincident with said communication zone associated with said identification data now being stored, updates said identification data being stored into the identification data corresponding to said determined communication zone.

7. A mobile satellite communication system comprising:
(a) a mobile station movable on the ground;
(b) a plurality of satellite base stations each moving along its orbit round the Earth and communicable with said mobile station located within its service area; and
(c) a plurality of switching centers placed on the ground and constituting a communication network in cooperation with said satellite base stations;
said plurality of switching centers each including:
(d) an identification data transmitter means for transmitting identification data corresponding to communication zone in which it lies;
said switching centers being provided individually corresponding to said communication zones;
said satellite base stations each including:
(e) an identification data transmitter means which, if service area of said satellite base station is located within one of said communication zones, transmits identification data received from said switching center placed in said one of said communication zones to said mobile station lying within said one of said communication zones;
said mobile station including:
(f) a registration means which detects a communication zone in which it lies based on communication signals containing said identification data from said satellite base stations and registers thus detected communication zone in which it lies into a monitor system;
(g) a memory means for storing as its location data, one of identification data corresponding to said communication zones;
(h) a zone detection means for detecting a communication zone in which it lies based on identification data from said satellite base stations; and
(i) a location registration means which, if the detected communication zone is not coincident with the communication zone associated with the identification data now being stored, loads into a system a location registration for permitting its location to be accessed, by use of the identification data corresponding to said detected communication zone.

8. A mobile satellite communication system according to claim 7, wherein
said mobile stations further comprising:
(j) an update means which, if the detected communication zone is not coincident with the communication zone associated with the identification data now being stored, updates said identification data being stored into the identification data corresponding to said detected communication zone.

9. A mobile satellite communication system comprising:
(a) a mobile station movable on the ground; and
(b) a plurality of satellite base stations each moving along its orbit round the Earth and communicable with said mobile station located within its service area;
said mobile stations including:
(c) a registration means which detects a terrestrial communication zone in which it lies based on zone identification data from a switching center of a terrestrial mobile communication system provided on each of terrestrial communication zones which are allocated in advance in the terrestrial mobile communication system, and which informs a system monitor section of a location in which it lies by use of its identification data;
(d) a memory means for storing, as its location data, one of identification data corresponding to terrestrial communication zones which are allocated in advance on the ground in said terrestrial mobile communication system;
(e) a zone detection means for detecting a terrestrial communication zone in which it lies, based on zone identification data from a switching center of said terrestrial mobile communication system provided on each of said terrestrial communication zones; and
(f) a location registration means which, if the detected terrestrial communication zone is not coincident with the terrestrial communication zone associated with the identification data now being stored, loads into a system monitor section a location registration for permitting its location to be accessed, by use of the identification data corresponding to said detected terrestrial communication zone.

10. A mobile satellite communication system according to claim 9, wherein
said mobile station further comprises:
(g) an update means which, if the detected terrestrial communication zone is not coincident with the terrestrial communication zone associated with the identification data now being stored, updates said identification data being stored into the identification data corresponding to said detected terrestrial communication zone.

11. A mobile satellite communication system comprising:
(a) a mobile station movable on the ground;
(b) a plurality of satellite base stations each moving along its orbit round the Earth and communicable with said mobile station located within its service area; and
(c) a plurality of earth switching centres placed on the ground and constituting a communication network in cooperation with said satellite base stations;
said mobile stations including:
(d) a memory means for storing, as its location data, one of identification data corresponding to terrestrial communication zones which are allocated in advance on the ground in said terrestrial mobile communication system;
(e) a zone detection means for detecting a terrestrial communication zone in which it lies, based on zone identification data from a switching center of said terrestrial mobile communication system provided on each of said terrestrial communication zones;
(f) a location registration means which, if the detected communication zone is not coincident with the terrestrial communication zone associated with the identification data being now stored, loads into a system monitor section a location registration for permitting its location to be accessed, by use of the identification data corresponding to said detected terrestrial communication zone; and
(g) an update means which, if the detected terrestrial communication zone is not coincident with the terrestrial communication zone associated with the identification data now being stored, updates said identification data being stored into the identification data corresponding to said detected terrestrial communication zone.

12. A location registration method for registering data on the location of a mobile station into a monitor section of a mobile satellite communication system, comprising the steps of:

(a) causing a mobile station to detect its absolute location on the earth based on communication signals from a plurality of satellite base stations; and (b) registering thus detected absolute location into said monitor section;

wherein said step (b) includes the steps of:

(b1) judging which communication zone it lies in of communication zones which are allocated in advance on the ground, based on its absolute location detected in said step (a);

(b2) comparing said communication zone judged in said step (b1) with a communication zone being previously stored; and (b3) if said judged communication zone is different from said communication zone being stored, registering its location into said monitoring section by use of identification data associated with said judged communication zone.

13. A location registration method according to claim 12, wherein said step (b) further includes the step of:

(b4) updating said stored communication zone into said judged communication zone.

14. A location registration method for registering data of the location of a mobile station into a monitor section of a mobile satellite communication system, comprising the steps of:

(a) causing said mobile station to detect its absolute location on the earth based on signals from a plurality of GPS satellites; and (b) registering thus detected absolute location into said monitor unit;

wherein said step (b) includes the steps of:

(b1) judging which communication zone it lies in of communication zones which are allocated in advance on the ground, based on its absolute location detected in said step (a);

(b2) comparing said communication zone judged in said step (b1) with a communication zone being previously stored; and (b3) if said judged communication zone is different from said communication zone being stored, registering its location into said monitoring section by use of identification data associated with said judged communication zone.

15. A location registration method according to claim 14, wherein said step (b) further includes the step of:

(b4) updating said stored communication zone into said judged communication zone.

16. A location registration method for registering data on the location of a mobile station into a monitor section of a mobile satellite communication system, comprising the steps of:

(a) causing a switching center to transmit identification data associated with a communication zone in which it lies to a plurality of satellite base stations;

(b) causing each of said satellite base stations to transmit said identification data received to a mobile station lying within a communication zone which it serves;

(c) causing said mobile station to receive said identification data transmitted from said satellite base stations to detect its communication zone;

(d) causing said mobile station to register the communication zone detected in said step (c) into said monitor section;

wherein said step (d) includes the steps of:

(d1) comparing its communication zone detected in said step (c) with a communication zone being previously stored; and (d2) if said detected communication zone is different from said stored communication zone, registering its location into said monitor section by using identification data associated with said detected communication zone.

17. A location registration method according to claim 16, wherein said step (d) further includes the step of:

(d3) updating said stored communication zone into said detected communication zone.

18. A location registration method for registering data on the location of a mobile station into a monitor section of a mobile satellite communication system, comprising the steps of:

(a) causing said mobile station to detect a terrestrial communication zone in which it lies based on signals from a switching center provided on each of terrestrial communication zones which are allocated in advance on the ground in a terrestrial mobile communication system; and (b) registering its location into said monitor section by use of identification data associated with detected communication zone;

wherein said terrestrial mobile communication system in said step (a) is a cellular system and wherein said step (b) includes the steps of:

(b1) comparing its terrestrial communication zone detected in said step (a) with the terrestrial communication zone being previously stored; and (b2) if said detected terrestrial communication zone is different from said stored terrestrial communication zone, registering its location into said monitor section by use of identification data associated with said detected terrestrial communication zone.

19. A location registration method according to claim 18, wherein said step (b) further includes the step of:

(b3) updating said stored terrestrial communication zone into said detected terrestrial communication zone.

* * * * *